United States Patent [19]
Babb et al.

[11] Patent Number: 5,622,319
[45] Date of Patent: Apr. 22, 1997

[54] PORTABLE WATER JETTER APPARATUS

[75] Inventors: Larry F. Babb, Grafton; Kenneth S. Kriedeman, Olmsted Township, both of Ohio

[73] Assignee: Emerson Electric Company, St. Louis, Mo.

[21] Appl. No.: 398,350

[22] Filed: Mar. 3, 1995

[51] Int. Cl.$^6$ ................................................. B05B 15/06
[52] U.S. Cl. .......................... 239/722; 239/198; 239/273; 137/355.27; 242/400.1; 242/401; 242/403; 242/404; 248/90; 15/104.33
[58] Field of Search ......................... 137/355.16, 355.17, 137/355.26, 355.28, 355.27; 15/104.33, 257.01; 248/80, 89, 90, 129; 242/398, 400, 400.1, 401, 403, 404, 403.1, 405, 405.1–405.3, 406

[56] References Cited

U.S. PATENT DOCUMENTS

| | | | |
|---|---|---|---|
| 3,048,870 | 8/1962 | Criscuolo. | |
| 3,162,878 | 12/1964 | Agostino | 15/104.33 |
| 4,364,139 | 12/1982 | Babb et al. | 15/104.33 |
| 4,671,315 | 6/1987 | Gardner | 169/52 X |
| 4,773,113 | 9/1988 | Russell | 15/104.33 X |
| 5,309,595 | 5/1994 | Salecker et al. | |
| 5,390,389 | 2/1995 | Rutkowski et al. | 15/104.33 |
| 5,419,497 | 5/1995 | Warrington | 239/198 X |

OTHER PUBLICATIONS

Ridgid/Kollmann, KJ–1250 Water Jetter, 3 pages, 1991.
Ridgid/Kollmann, KJ–2100 Water Jetter, 1 page, 1992.
General Jet Set, J–1400; J–1450 and J–1600 Electric Jet, 5 pages, undated.

*Primary Examiner*—Lesley D. Morris
*Attorney, Agent, or Firm*—Vickers, Daniels & Young

[57] ABSTRACT

Portable water jetting apparatus is disclosed comprising a longitudinally collapsible cart having wheels at one end and a handle at the other, a water jetter unit removably mounted on the cart adjacent the wheeled end thereof, and a jetter hose reel unit mounted on the cart adjacent the handle end thereof. Both the water jetter unit and hose reel unit are adapted to be quickly and selectively disconnected from the cart to facilitate use, transportation, and/or storage of the apparatus, and the hose reel unit is pivotally mounted on the cart for selective orientation of the reel axis relative to the cart and thus the direction of winding or unwinding of the jetter hose therefrom during use of the apparatus.

48 Claims, 7 Drawing Sheets

PORTABLE WATER JETTER APPARATUS

BACKGROUND OF THE INVENTION

This invention relates to the art of water jetting apparatus for cleaning sewer and drain lines and, more particularly, to improvements in portable water jetting apparatus.

Water jetters are well known and comprise a motor driven pump for delivering pulses of water under high pressure through a jetter hose which is fed into a drain or sewer line to clear blockages in the lines caused by grease, sludge and the like. Generally, the hose has an outlet nozzle designed to pressurize the blockage while directing a part of the fluid pressure rearwardly of the nozzle so as to advance the hose through the drain or sewer line as the blockage deteriorates. The motor and pump or water jetter unit which provides the pulsating delivery of water through the hose is not particularly big or heavy, but portability of the apparatus is made difficult by the fact that it is often necessary to have 100 to 200 feet of hose to feed into a particular drain line to be cleaned. Accordingly, a variety of two-wheeled and four-wheeled carts and stands have been devised to support a water jetter unit and a jetter hose reel for rolling movement from one location to another along an underlying support surface. While thus providing portability, the arrangements heretofore available have been complex with regard to the structure of the cart and the mounting of the water jetter unit and hose reel thereon. Further, such prior arrangements are in many respects difficult for one person to manipulate with respect to lifting the apparatus into or from a transporting vehicle such as an automobile or truck, or transporting the apparatus from one elevation to another such as along a stairway, are inconvenient and/or of limited convenience with respect to use and manipulation in areas with space restrictions, and do not optimize either a storage operation or efficient use of storage space. In this respect, for example, the water jetter unit and hose reel are often permanently mounted on the stand or cart making it difficult for one person to manipulate the equipment into and out of small spaces and, because of the weight, making it difficult for one person to move the equipment up and down stairways or into and out of a transporting vehicle such as an automobile or truck.

Moreover, the foregoing problems are also encountered in connection with the profiles of the cart, water jetter unit and hose reel which provide for the overall assembly to be undesirably large and/or difficult to balance and/or guide when wheeling the assembly along an underlying surface. Further, while one or the other of the water jetter unit and hose reel may be detachable from the cart in an effort to facilitate use and/or storage of the apparatus, the remaining structure is not sufficiently reduced in size, weight, and/or profile to minimize the foregoing problems attendant to maneuvering, transporting, loading and unloading and storage of the apparatus.

SUMMARY OF THE INVENTION

Water jetting apparatus is provided in accordance with the present invention which advantageously minimizes or overcomes the foregoing disadvantages and others regarding such apparatus heretofore available. More particularly in this respect, a wheeled cart, water jetter unit and jetter hose reel in accordance with the invention are structured and structurally interrelated so as to provide water jetting apparatus having improved portability, versatility, compactness and storage capabilities relative to such previous apparatus. The cart is light in weight and structurally simple, and both the water jetter unit and the jetter hose reel are removably mounted on the cart through quick release mechanisms. Thus, an operator has a number of options with respect to transporting, using and/or storing the apparatus. In this respect, for example, the wheeled cart can be used to move the apparatus along an underlying surface to or near to a work area. Then, as space and/or other work area conditions dictate, the operator can operate the apparatus without removing the water jetter unit and hose reel from the cart, or the operator can remove one or the other or both of the latter from the cart and suitably locate them in the work area so as to optimize the sewer or drain line cleaning operation. As a further example, if transportation of the apparatus from a truck or the like to a work area is across terrain that does not facilitate use of the cart, the water jetter unit and hose reel can be detached therefrom and all three pieces carried by the operator to a location where transportation by the cart is possible. Alternatively, under such conditions, the operator can carry just the water jetter unit and hose reel to the work area. With regard to storage of the apparatus, the detachability of the water jetter unit and hose reel enables optimizing use of available storage space. Preferably, the cart is collapsible to further facilitate optimal use of storage space. Preferably, the cart is provided with stair climbing skids which facilitate movement of the apparatus up and down stairways.

Still further in accordance with the invention, the water jetter unit and jetter hose reel are mounted on the cart in side-by-side relationship between the opposite ends thereof, thus to improve the distribution of weight of these components in a manner which improves the ease and stability with which an operator can maneuver the apparatus along an underlying surface. Moreover, the mounting arrangement provides for the cart to have a use position with the water jetter unit and hose reel attached thereto in which the wheels and handle of the cart engage an underlying surface, thus minimizing the vertical height of the apparatus and facilitating access to the water jetter unit and hose reel. Preferably, the mounting of the hose reel on the cart enables selective orientation of the hose reel axis relative to the cart to facilitate the paying out of the jetter hose relative to the cart in a direction best suited for insertion and movement of the jetter hose into the sewer or drain line to be cleaned.

It is accordingly an outstanding object of the present invention to provide improved portable water jetting apparatus of the character comprising a wheeled cart, a water jetter unit and a jetter hose reel.

Another object is the provision of water jetting apparatus of the foregoing character wherein the cart, water jetter unit, and jetter hose reel are structured and structurally interrelated to provide improved portability with respect to the apparatus and with respect to the component parts thereof.

A further object is the provision of water jetting apparatus of the foregoing character wherein the cart, water jetter unit and jetter hose reel are structured and structurally interrelated to provide improved ease and versatility with respect to transportation, use and storage of the apparatus and the component parts thereof.

Yet another object is the provision of water jetting apparatus of the foregoing character wherein both the water jetter unit and the jetter hose reel are detachably mounted on the cart thus enabling, selectively, transportation, use and storage of the jetter unit and hose reel either with the cart, or partially or totally independent of the cart.

Still another object is the provision of water jetting apparatus of the foregoing character in which the cart is structurally simple and has a use position horizontal to an underlying surface and wherein the water jetter unit and jetter hose reel are mounted side-by-side on the cart between the opposite ends thereof, whereby the apparatus in the use position of the cart has a low profile and the jetter unit and hose reel are easily accessible.

Still a further object is the provision of water jetting apparatus of the foregoing character wherein the structure of the cart and the positional arrangement of the water jetter unit and jetter hose reel thereon provide improved distribution of weight relative to the cart, whereby an operator can transport the apparatus along an underlying surface with improved balance and stability.

BRIEF DESCRIPTION OF THE DRAWING

The foregoing objects, and others, will in part be obvious and in part pointed out more fully hereinafter in conjunction with the written description of a preferred embodiment illustrated in the accompanying drawings in which.

DESCRIPTION OF A PREFERRED EMBODIMENT

Figure 1:
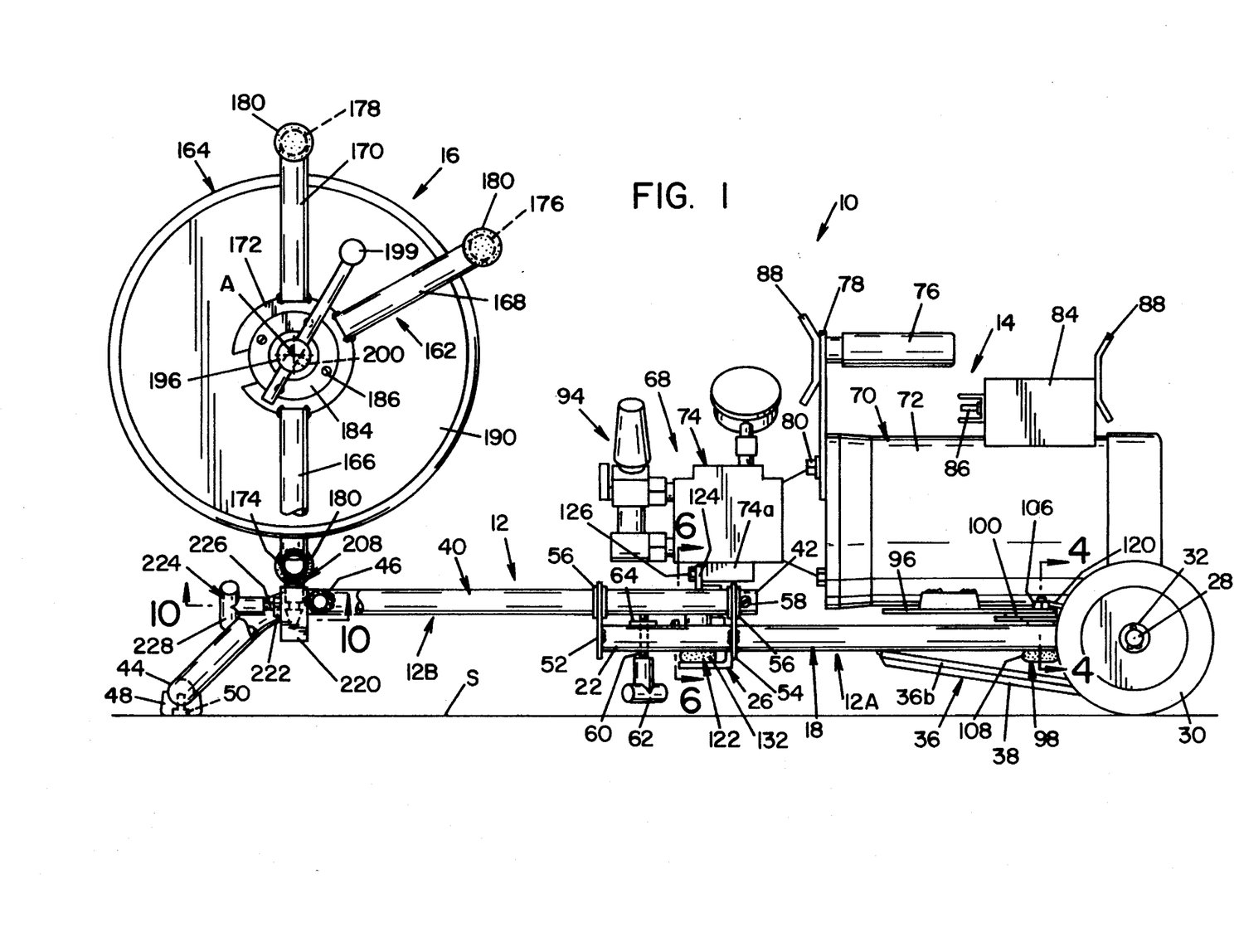
FIG. 1 is a side elevation view of water jetting apparatus according to the present invention.
Figure 2:
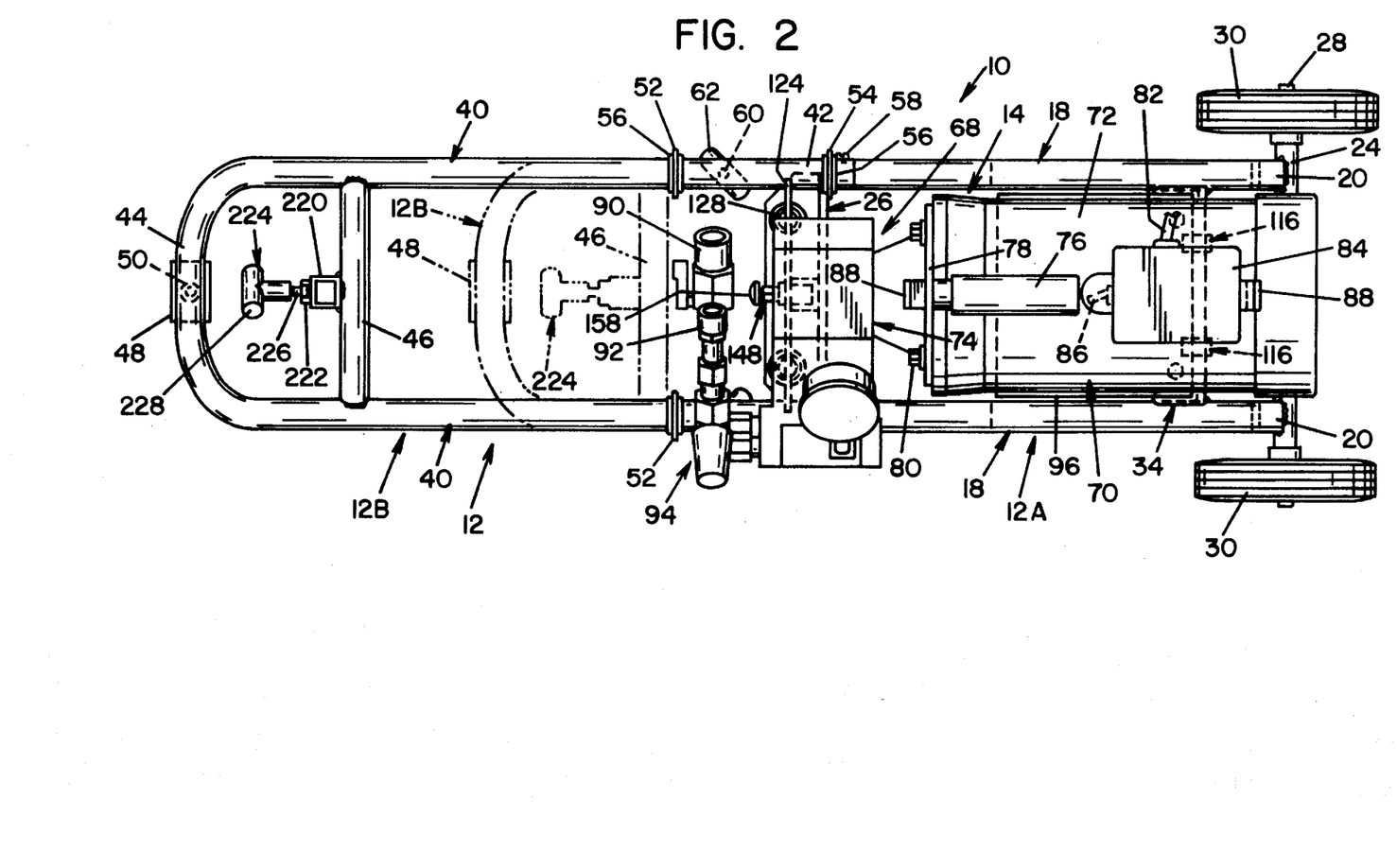
FIG. 2 is a plan view of the apparatus shown in FIG. 1.
Figure 3:
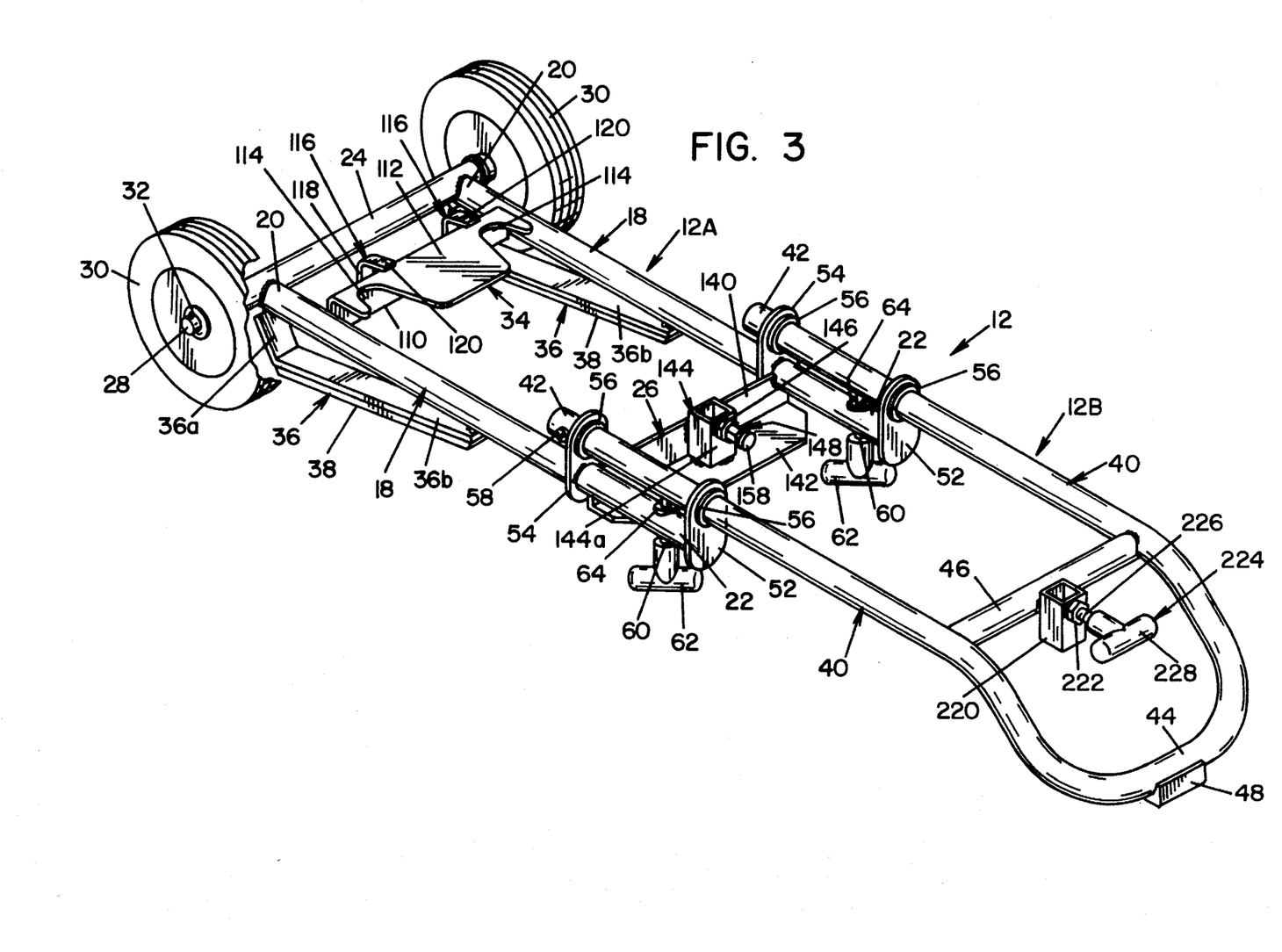
FIG. 3 is a perspective view of the wheeled cart of the apparatus.

Referring now in greater detail to the drawing wherein the showings are for the purpose of illustrating a preferred embodiment of the invention only and not for the purpose of limiting the invention, water jetting apparatus 10 according to the invention comprises a wheeled cart 12, a water jetter unit 14 and a jetter hose reel unit 16, which water jetter and hose reel units are each detachably mounted on cart 12 as described more fully hereinafter. As best seen in FIGS. 1–3 cart 12 is basically of tubular construction and comprises sections 12A and 12B which are slidably interengaged to provide for collapsing and extending the cart as set forth more fully hereinafter. Section 12A is comprised of parallel tubular side members 18 having outer ends 20 and inner ends 22. Outer ends 20 are laterally spaced apart and interconnected by a wheel axle tube 24 which is suitably secured thereto such as by welding, and inner ends 22 are laterally spaced apart and interconnected by an L shaped support member 26 having its laterally opposite ends secured to tubes 18 such as by welding. The structure and function of support member 26 are described in greater detail hereinafter. An axle rod 28 extends through tube 24 and is rotatably supported thereby, and wheels 30 are mounted on the laterally opposite ends of the axle rod. The axle rod and wheels are laterally retained relative to axle tube 24 such as by cotter pins 32 extending through the outer ends of axle rod 28. A water jetter mounting and support member 34 extends between side members 18 adjacent ends 20 thereof, and the laterally opposite ends of support member 34 are secured to members 18 such as by welding. The structure and function of support member 34 are also described in greater detail hereinafter. A generally L-shaped stair climbing skid 36 is mounted on the underside of each of the side members 18, such as by welding. Each skid includes an outer leg 36a extending downwardly and inwardly from end 20 of the corresponding side member and an inner leg 36b extending inwardly and upwardly from outer leg 36a. As is well known, stair climber skids 36 facilitate movement of the cart upwardly and downwardly along a stairway. To facilitate the latter function inner legs 36b are preferably provided with a stair climber pad 38 of suitable plastic material.

Section 12B of cart 12 is a generally U-shaped tubular member comprising laterally spaced apart parallel legs 40 having inner ends 42 and outer ends laterally interconnected by an integral U-shaped bridging portion 44 therebetween. A tubular support member 46 which serves a function set forth more fully hereinafter extends laterally between the outer ends of legs 40 and is suitably secured thereto such as by welding. Bridging portion 44 provides a handle for the cart at the corresponding end thereof and inclines downwardly relative to legs 40 such that the wheels 30 and handle portion engage an underlying surface S to support the cart in a generally horizontal use position as shown in FIG. 1. Preferably, to protect the handle portion from damage and to stabilize the cart against rolling movement in the use position thereof, bridging portion 44 is provided with a foot pad 48 of rubber or the like which is suitably secured thereto such as by threaded fasteners 50.

Cart sections 12A and 12B are adapted to be interengaged for relative sliding displacement in the direction between the opposite ends of the cart and, for this purpose, side members 18 of cart portion 12A are each provided with a pair of longitudinally spaced apart support and guide plates 52 and 54. Guide plates 52 are welded to the innermost ends of inner ends 22 of side members 18 and are provided with openings, not designated numerically, for receiving ends 42 of legs 40 of cart section 12B. Plates 54 are apertured to receive side members 18 and are secured thereto by welding and are also provided with openings, not designated numerically, for receiving ends 42 of legs 40. Preferably, the openings receiving leg ends 42 are provided with bushings 56 of a suitable material such as plastic to facilitate the sliding interengagement between cart sections 12A and 12B. Inner ends 42 of legs 40 of cart section 12B are provided with threaded fasteners having heads 58 positioned to engage bushings 56 on plates 54 to preclude separation of the cart sections. The sliding interengagement between cart sections 12A and 12B provides for the latter section to be adjustable relative to section 12A between the fully extended position shown by solid lines in FIGS. 1 and 2 and the broken line position of section 12B shown in FIG. 2. The cart sections are adapted to be secured in an adjusted relative position therebetween and, for this purpose, inner ends 22 of side members 18 are provided with locking bolts 60 having operating handles 62 on the outer ends thereof. Locking bolts 60 are in threaded interengagement with nuts 64 which are welded to ends 22 of the side members, and the inner ends 66 of bolts 60 are thus adapted to be moved toward and away from end 42 of the corresponding leg 40 to releasably secure the cart sections in a desired relative position therebetween.

Water Jetter unit 14 in the illustrated embodiment is comprised of a pump assembly 68 adapted to be driven by an electric motor 70. Motor 70 includes a housing 72 and pump assembly 68 includes a housing 74 mounted on the output end of motor 70. The jetter unit is adapted to be lifted and carried by means of a handle 76 attached to a mounting plate 78 which is secured to the motor housing by bolts 80. Motor 70 is adapted to be energized through an electrical cord 82, only a portion of which is shown for purposes of clarity, and the latter is electrically connected to motor 70 in a wiring box 84 which is provided with an on/off switch 86 for the motor. Handle mounting bracket 78 and wiring box 84 are provided with support plate members 88 about which motor cord 82 is adapted to be wrapped for storage. As is well known, pump 68 includes a water inlet coupling 90 adapted to be connected to a source of water under pressure and an outlet coupling 92 which is adapted to be connected to a jetter hose, not shown, through a pressure control and unloading valve 94. As is further well known, such a water jetter unit is operated, basically, by connecting coupling 90 to a source of water under pressure and connecting coupling 92 to a jetter line or hose, turning the water on, turning motor 70 on and opening valve 94 to obtain the desired discharge pressure of water into the jetter hose.

Figure 4:
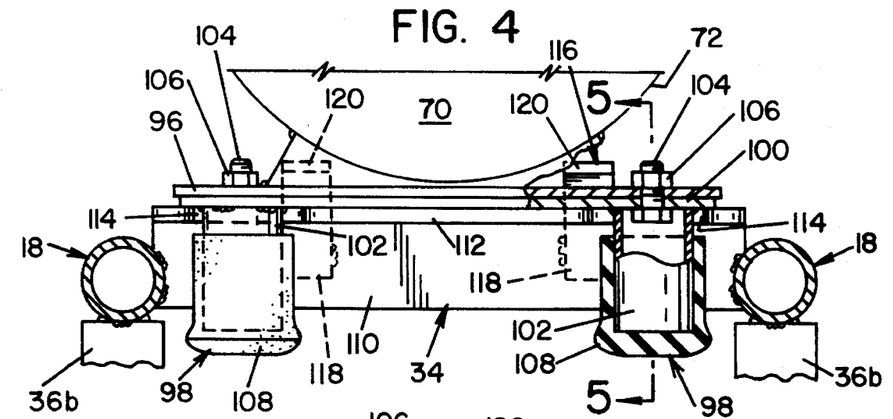
FIG. 4 is a sectional elevation view taken along line 4—4 in FIG. 1 and showing a portion of the mounting arrangement for the water jetter unit.
Figure 5:
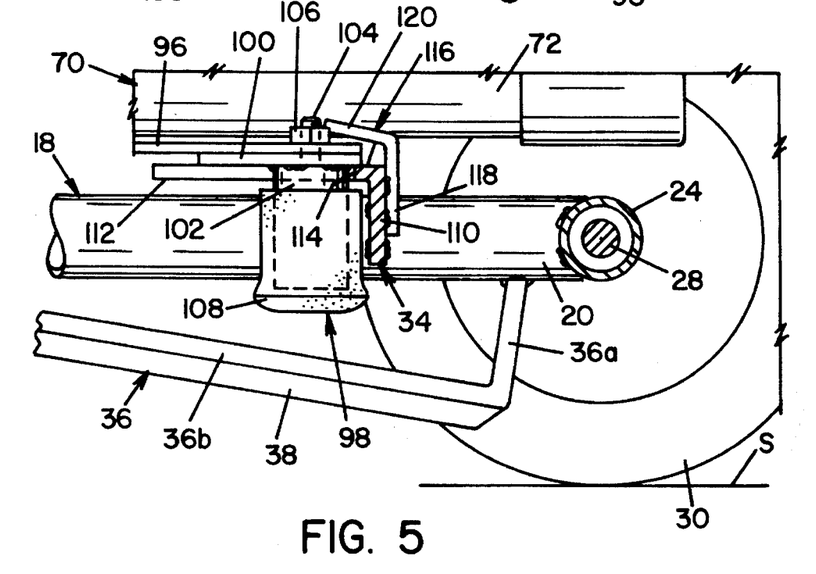
FIG. 5 is a sectional elevation view taken along line 5—5 in FIG. 4.

As best seen in FIGS. 4 and 5, a motor base plate 96 is attached to the bottom of motor housing 72 such as by welding, and a pair of jetter unit support feet 98 are mounted on the base plate by means of a foot mounting plate 100. More particularly in this respect, each support foot 98 is comprised of a tubular foot member 102 welded to the underside of mounting plate 100, and the latter is apertured coaxially with tubular foot members 102 to receive mounting bolts 104 which extend upwardly through openings therefor in base plate 96 to receive nuts 106 by which mounting plate 100 and thus tubular foot members 102 are secured to base plate 96. Preferably, rubber foot pads 108 are provided on the lower ends of tubular foot members 102. Referring now to FIG. 3 in conjunction with FIGS. 4 and 5, support member 34, which extends between ends 20 of side members 18 of cart portion 12A, includes a downwardly extending leg 110 by which the support member is welded to side members 18 and an inwardly extending plate portion 112 which includes laterally spaced apart generally U-shaped recesses 114 facing longitudinally inwardly of cart portion 12A. Support member 34 further includes a pair of fingers 116 each of which has a lower portion 118 welded to leg 110 of support member 34 and an upper portion 120 which extends upwardly and inclines inwardly across plate 112 of support member 34. As will be best appreciated from FIGS. 4 and 5, when water jetter unit 14 is mounted on cart 12, foot mounting plate 100 and motor base plate 96 are wedged beneath finger portions 120 and tubular foot members 102 are received in recesses 114 and depend below plate 112 of support member 34.

Figure 6:
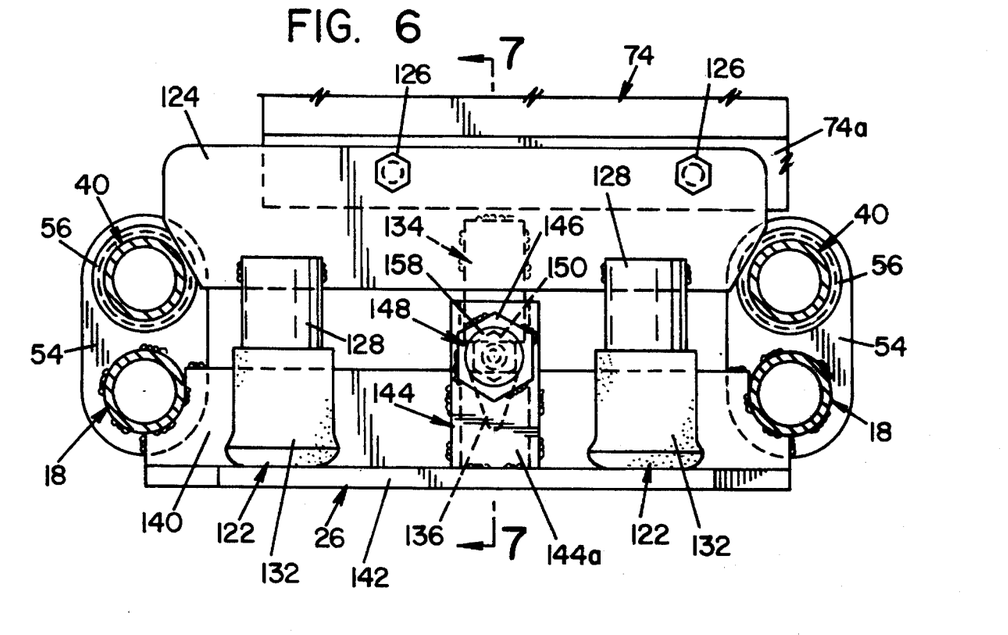
FIG. 6 is a sectional elevation view taken along line 6—6 in FIG. 1 and showing another portion of the mounting arrangement for the water jetter unit.
Figure 7:
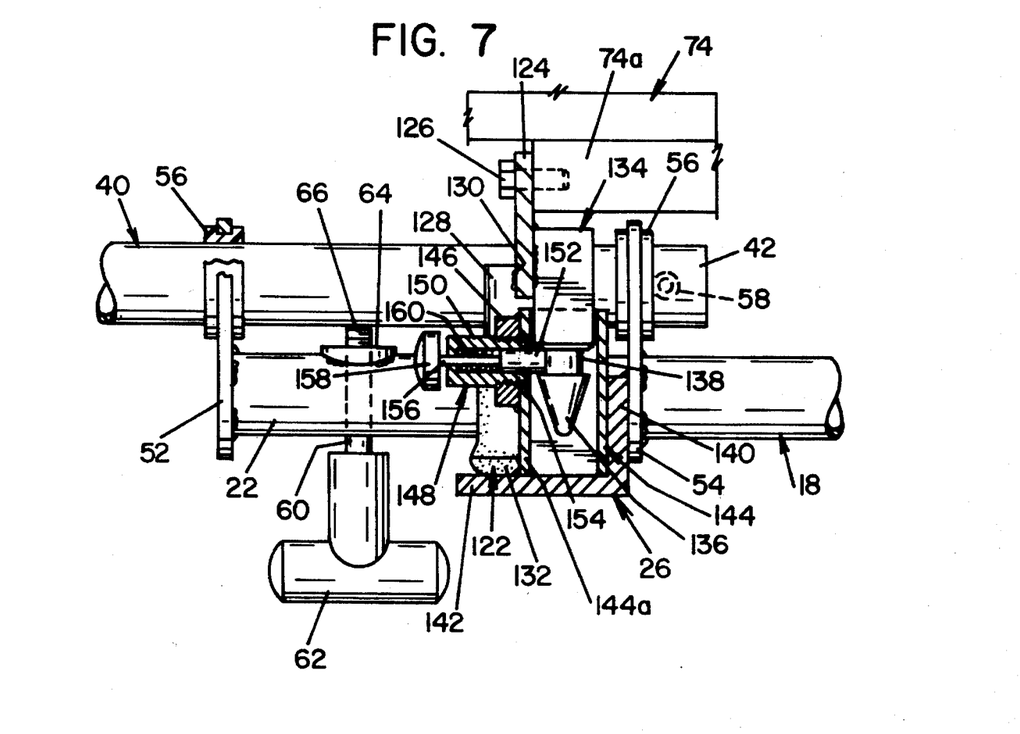
FIG. 7 is a sectional elevation view taken along line 7—7 in FIG. 6.

Referring now to FIGS. 6 and 7, the bottom of pump housing 74 includes an integral cast portion 74a, and a pair of support feet 122 are mounted on housing portion 74a by means of a foot mounting plate 124 secured to the latter by bolts 126. Each foot 122 is comprised of a tubular foot member 128 having a vertical slot 130 in its upper end receiving mounting plate 124, and the foot is secured to mounting plate 124 by welding. The lower end of each tubular foot member 128 is preferably provided with a rubber foot pad 132. Mounting plate 124 is provided between feet 122 with a downwardly extending plug 134 secured to plate 124 by welding. Plug 134 is square in cross section except for the lowermost end or nose 136 thereof which is conical and which is separated from the square body portion of the plug by a peripheral recess 138. Returning again to FIG. 3 in conjunction with FIGS. 6 and 7, support member 26 which extends laterally between side members 18 of cart portion 12A includes an upwardly extending leg 140 by which the support member is welded to side members 18, and an inwardly extending plate portion 142 which underlies feet 122 and thus supports the corresponding end of water jetter unit 14. A square tubular receptacle 144 is welded or otherwise secured to one or the other or both of the plate portions 140 and 142 of support member 26 and in a position relative thereto to receive plug 134 on foot support plate 124. A threaded nut 146 is welded to wall 144a of receptacle 144 for mounting a spring biased pull pin 148 by which plug 134 is releasably captured in receptacle 144. Pull pin 148 includes a tubular body portion 150 threadedly interengaged with nut 146 and a latch pin 152 which normally extends through an opening 154 provided therefor in wall 144a and into plug recess 138. Latch pin 152 includes a stem 156 having an operating knob 158 at the outer end thereof, and a coil spring 160 surrounds stem 156 and biases latch pin 152 inwardly of receptacle wall 144a so that the pin projects radially inwardly of plug recess 138. It will be appreciated therefore that when plug 134 is in receptacle 144, latch pin 152 extends into plug recess 138 to preclude displacement of the plug from the receptacle and, thus, lifting of the corresponding end of water jetter unit 14. It will likewise be appreciated that plug 134 is released for upward displacement from receptacle 144 by pulling outwardly on operating knob 158 to displace latch pin 152 from plug recess 138.

As will be understood from the foregoing description, water jetter unit 14 is detachably mounted on cart 12 and can be quickly removed therefrom by grasping handle 76, pulling outwardly on operating knob 158 of pull pin 148, elevating the pump end of the unit to withdraw plug 134 from receptacle 144, and sliding the motor end of the jetter unit from beneath finger portions 120 of support member 34. When so removed, feet 98 and 122 are adapted to support the water jetter unit on an underlying surface. The water jetter unit is likewise readily re-mounted on cart 12 by positioning the support plate components at the end of the motor housing beneath finger portions 120 and then lowering the pump end of the unit for plug 134 to enter receptacle 144, whereby nose 136 of plug 134 cams latch pin 152 outwardly until plug recess 138 is aligned with the pin. When such alignment occurs, spring 160 biases latch pin 152 into recess 138 to again releasably capture plug 134 to releasably hold the jetter unit on the cart.

Figure 8:
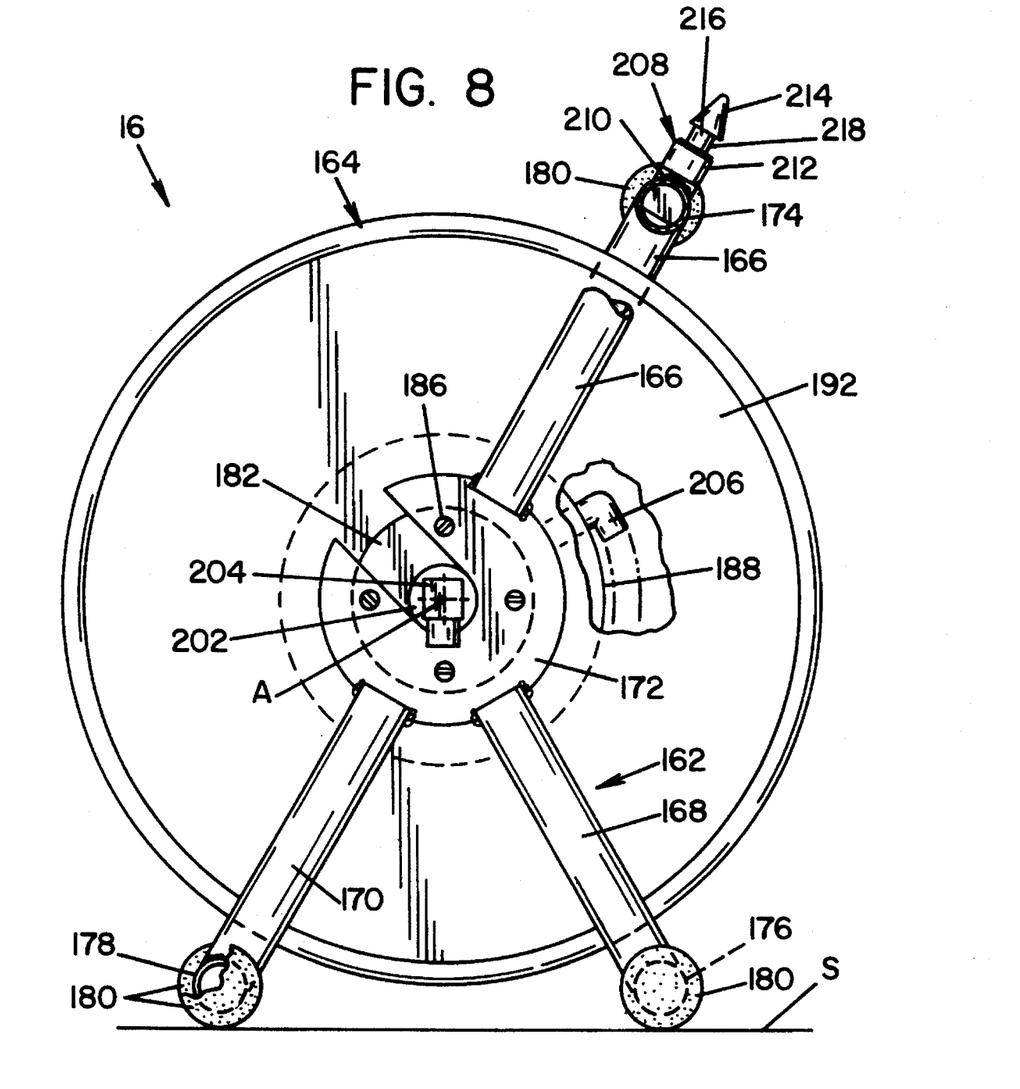
FIG. 8 is a side elevation view of the jetter hose reel unit detached from the cart.
Figure 9:
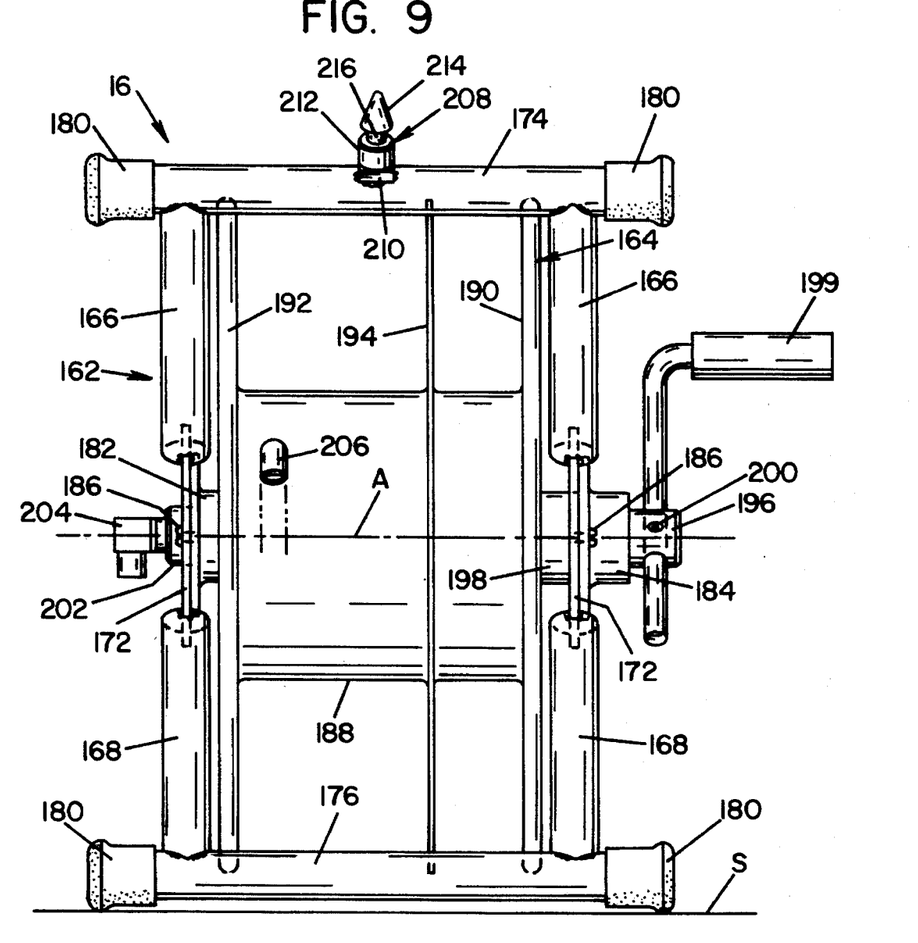
FIG. 9 is an end elevation view of the hose reel unit looking from right to left in FIG. 8.

Referring now to FIGS. 8 and 9 in conjunction with FIG. 1, jetter hose unit 16, which is detachably and adjustably mounted on cart 12 as described more fully hereinafter comprises a generally Y-shaped frame assembly 162 which supports a hose reel 164 for rotation about a reel axis A. Frame assembly 162 comprises tubular legs 166, 168 and 170 on each of the axially opposite sides of the drum and having radially inner ends welded to a corresponding frame plate 172. Axially extending tubular leg members 174, 176 and 178 are respectively welded to the radially outer ends of legs 166, 168 and 170. The axially opposite ends of legs 174, 176 and 178 extend axially outwardly of the corresponding one of the legs 166, 168 and 170 and are provided with rubber foot pads 180 which protect the axially outer ends of the frame legs. As will be appreciated from FIGS. 8 and 9, when hose reel unit 16 is detached from cart 12 legs 168 and 170 and legs 176 and 178 are adapted to support hose reel 164 relative to an underlying surface S, and foot pads 180 on frame legs 176 and 178 stabilize such support in addition to protecting the frame legs.

Hose reel frame assembly 162 further includes flanged bearing members 182 and 184 on axially opposite sides of drum 164 and secured to the corresponding one of the frame plates 172 by a plurality of threaded fasteners 186. Reel 164 is comprised of a circular hub portion 188, axially spaced apart end flanges 190 and 192 and, in the embodiment illustrated, a flange 194 between flanges 190 and 192 dividing the space therebetween for the reasons set forth hereinafter. Reel 164 further includes a stub shaft 196 extending through bearing member 184 and a flanged spacer 198 between frame plate 172 and reel flange 190. The inner end of shaft 196, not shown, is attached to reel flange 190 for rotation with the reel, and the outer end of the shaft is aperture to receive a crank 199 which is secured thereto such as by a set screw 200 and by which the reel is manually rotatable. Reel 164 further includes a tubular stub shaft 202 at the end thereof opposite crank 199 and which stub shaft is interconnected with the reel frame against rotation relative thereto. The inner side of reel flange 192 is provided with a flanged bearing member, not shown, which is attached to flange 192 for rotation therewith, and stub shaft 202 extends through the latter bearing member and rotatably supports the latter and thus the corresponding end of reel 164. The axially outer end of tubular stub shaft 202 is provided with a water inlet elbow coupling 204, and hub 188 of reel 164 is provided with a water outlet elbow coupling 206. As is well known, a swivel connector, not shown, is provided within hub 188 of reel 164 to interconnect the axially inner end of tubular stub shaft 202 and the inner end of outlet coupling 206. As is further well known, coupling 206 is adapted to receive the inlet end of a length of jetter hose wound on hub 188 between flanges 192 and 194 thereof, and inlet coupling 204 is adapted to be connected to outlet coupling 92 of water jetter unit 14, whereby water can flow from the latter to the jetter hose on reel 164 and through the hose to the outlet end thereof while the hose is being unwound from the reel, thus enabling use of the apparatus without removing the hose from the reel. The space between flanges 190 and 194 provides storage space for an additional length of hose of the same or different diameter than that of the hose between flanges 192 and 194. As an alternative to using the latter hose, a length of hose such as that stored on the reel between flanges 190 and 194 can be removed from the reel and connected directly to outlet 92 of the water jetter unit.

Figure 10:
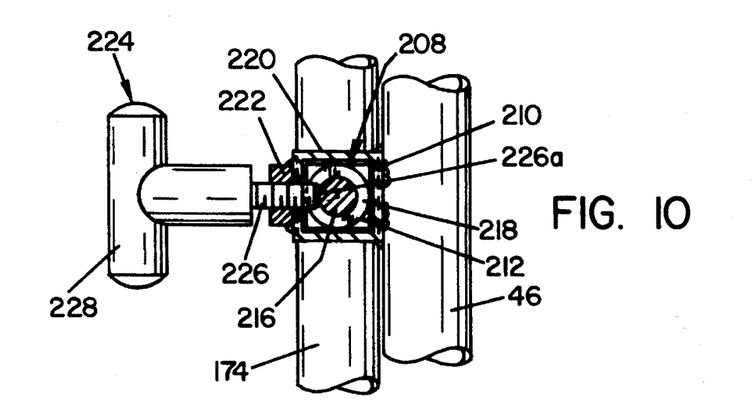
FIG. 10 is a cross-sectioned view of the hose reel mount looking in the direction of line 10—10 in FIG. 1.

As best seen in FIGS. 8 and 9, cross leg 174 of reel frame assembly 162 is provided with a plug member 208 having an inner body portion 210 which is square in cross section, an outer body portion 212 which is circular in cross section, and a conical nose portion 214. Nose 214 is connected to body portion 212 by a portion 216 of reduced diameter which provides an annular recess 218 between body portion 212 and nose 214. Square body portion 210 extends through an opening therefor in frame member 174, and the plug is suitably secured to the latter frame member such as by welding body portion 210 thereto. As best seen in FIGS. 2, 3 and 10, cross support member 46 on portion 12B of cart 12 is provided with a square tubular receptacle 220 which is welded or otherwise secured to support member 46 so that the axis of the receptacle is vertical when frame 12 is in its use position shown in FIG. 1. One wall of receptacle 220 is provided with an internally threaded nut 222 secured thereto such as by welding and an aperture through the wall, not designated numerically, coaxial with nut 222. A reel locking and releasing member 224 comprising a threaded shank 226 having an operating knob 228 at the outer end thereof is operable to releasably mount reel unit 16 on cart 12 in a manner whereby the hose reel unit is pivotal about the axis of receptacle 220. More particularly in this respect, threaded shank 226 extends through nut 222 in threaded engagement therewith and has an inner end 226a adapted to extend radially into recess 218. When so positioned, end 226a underlies the upper wall of recess 218 to vertically position plug 208 in receptacle 220 such that square body portion 210 of the plug is spaced outwardly from the upper end of the receptacle. Thus, it will be appreciated that operating knob 228 can be rotated to displace inner end 226a of threaded shank 226 against connecting member 216 of plug 208 so as to releasably lock hose reel unit 16 in a desired orientation relative to cart 12. The orientation can be quickly changed by turning operating knob 228 in the direction to displace end 226a of shank 226 radially outwardly from engagement with connecting portion 216, whereby circular body portion 212 of plug 208 is rotatable in receptacle 220 about the axis thereof. Similarly, complete release of reel assembly 16 for separation from cart 12 is achieved by withdrawing end 226a of shank 226 to the extent necessary for end 226a to clear circular body portion 212, whereby the latter can be axially withdrawn from the receptacle and the hose reel unit supported on underlying surfaces in the orientation shown in FIG. 8. When so removed, any one of the cross legs 174, 176 and 178 can be used as a handle for carrying the hose reel unit.

As will be appreciated from the foregoing description, when the component parts are in the positions shown in FIG. 1, the jetting apparatus can be used by connecting a short hose between drum inlet coupling 204 and pump outlet coupling 92, and unwinding the jetter hose from reel 164 to the extent necessary to introduce the outlet end thereof into a drain or sewer line to be cleaned. Alternatively, hose reel unit 16 can be removed from cart 12 in the manner described above, supported on underlying surfaces as shown in FIG. 8 with the short hose connected between the pump outlet and reel inlet as described above. In this disposition of the component parts, the jetter hose can be unwound from the reel to the extent necessary to reach the point of use thereof. As yet another alternative, water jetter unit 14 can be removed from cart 12 in the manner described above and supported on underlying surfaces separate from or together with hose reel unit 16, thus enabling the jetter unit and hose reel unit to be used in a confined space independent of cart 12. As still another alternative, the hose can be completely unwound and disconnected from drum 164, and/or the extra jetter hose stored in the area between reel flanges 190 and 194 can be removed from the reel and, in either case, the inlet end of the jetter hose directly connected to pump outlet coupling 92. In particular with regard to the positions of the component parts shown in FIG. 1, it will be appreciated that the side-by-side disposition between the water jetter unit and hose reel unit advantageously provides easy access thereto for making the necessary hose connections and that the swivel capability with respect to the hose reel unit relative to the cart adds to the versatility and ease of use in those environments where it is not necessary to separate one or the other or both the jetter unit and hose reel unit from the cart.

In connection with transportation of the apparatus from one location to another, it will be appreciated that when the component parts are in the positions shown in FIG. 1, handle 44 of cart 12 can be grasped and the handled end thereof elevated to pivot the cart upwardly about the axis of wheels 30 to an inclined position in which the cart with the water jetter unit and hose reel unit thereon can be wheeled along underlying surfaces. With further regard to transportation of the apparatus, it will be appreciated that either one or both the water jetter unit and hose reel unit can be quickly separated from cart 12 and carried by hand, and that the cart can be collapsed longitudinally and carried by hand. These features enhance transportation of the apparatus where the work area is not totally accessible through the use of the cart. At the same time, use of the cart for transporting the apparatus is enhanced by the provision of the stair climber skids. Wheeled transportation of the apparatus is further enhanced by the side-by-side orientation of the water jetter unit and hose reel assembly. In this respect, the latter disposition of the component parts distributes the weight thereof along the length of the cart, thus to provide the operator with better control during rolling movement of the cart than would be possible if, for example, the hose reel were mounted above the water jetter unit, thus shifting the center of gravity forwardly relative to the axis of wheels 30 when the cart is inclined.

The selective removability of water jetter unit 14 and jetter hose reel unit 16 from cart 12 which enhances versatility with respect to use of the apparatus as described above also provides versatility with regard to storage of the apparatus. More particularly in this respect, it will be appreciated that either one or both of the jetter unit and hose reel unit can be detached from cart 12 and stored separately therefrom so as to optimize the use of available storage space. Further in connection with such storage, it will be appreciated that the sliding connection between cart sections 12A and 12B enables the cart to be longitudinally collapsed so as to minimize the space requirement for storage thereof. Moreover, the cart can be collapsed to some extent with hose reel unit 16 attached thereto so as to minimize the length of space required if it is desired to store the apparatus in the assembled condition thereof and, by removing hose reel unit 16, the cart can be fully collapsed to minimize the storage space for the cart with the water jetter unit remaining attached thereto.

While considerable emphasis has been placed upon the structures and structural interrelationships between the component parts of the preferred embodiment of water jetting apparatus according to the present invention, it will be appreciated that many changes can be made in the preferred embodiment and that other embodiments can be devised without departing from the principles of the invention. Accordingly, it is to be distinctly understood that the foregoing descriptive matter is to be interpreted merely as illustrative of the invention and not as a limitation.

We claim:

1. Water jetting apparatus comprising a cart having longitudinally opposite ends and laterally spaced apart sides, wheel means at one of said opposite ends, handle means at the other of said opposite ends, said spaced apart sides including longitudinally extending side member means, longitudinally spaced apart first, second and third support member means each extending laterally between said side member means, a water jetter unit, means including first latch means for removably attaching said jetter unit to said first and second support member means, jetter hose reel means, and means including second latch means for removably attaching said hose reel means to said third support member means.

2. Water jetter apparatus according to claim 1, wherein said first, second and third support member means are spaced apart sequentially in the direction from said one of said opposite ends toward the other.

3. Water jetting apparatus according to claim 1, wherein said hose reel means includes a hose reel having an axis of rotation parallel to a plane between said side member means, and said means for removably attaching said hose reel means includes means for adjusting the angular position of said axis of rotation relative to the direction between said opposite ends of said cart.

4. Water jetting apparatus according to claim 1, wherein said hose reel means includes a hose reel and hose reel frame means supporting said hose reel for rotation about a reel axis, said frame means including leg means for supporting said hose reel for rotation about said reel axis when said hose reel means is removed from said cart.

5. Water jetting apparatus according to claim 1, wherein said water jetter unit has top and bottom sides with respect to said cart, said top side including a handle for lifting said unit, and said bottom side including foot means for supporting said jetter unit when removed from said cart.

6. Water jetting apparatus according to claim 1, wherein each said longitudinally extending side member means includes first and second side members, means interconnecting said first and second side members for relative longitudinal displacement, and means for releasably interengaging said first and second side members against relative displacement.

7. Water jetting apparatus according to claim 1, wherein said means for removably attaching said jetter unit to said first and second support member means includes longitudinally slidably interengaging means on said jetter unit and said first support member means for restraining separation of said jetter unit from said cart transverse to the direction between said opposite sides.

8. Water jetting apparatus according to claim 7, wherein said first latch means includes a first latch member mounted on one of said jetter unit and said second support member means and first latch keeper means mounted on the other of said jetter unit and second support member means.

9. Water jetting apparatus according to claim 8, wherein said first support member means is adjacent said one of said opposite ends of said cart and said second support member means is spaced from said first support member means in the direction toward said other of said opposite ends.

10. Water jetting apparatus according to claim 8, wherein said water jetter unit has top and bottom sides with respect to said cart, said top side including a handle for lifting said unit, and said bottom side including foot means for supporting said jetter unit when removed from said cart.

11. Water jetting apparatus according to claim 10, wherein said foot means includes first and second pairs of foot members extending downwardly from said bottom side, said first pair of foot members having lower ends spaced below said first support member means, and said second pair of foot members having lower ends resting on said second support member means.

12. Water jetting apparatus according to claim 8, wherein said first latch member is mounted on said jetter unit and said first latch keeper means includes a receptacle for receiving said first latch member, and a first latch keeper on said receptacle for releasably interengaging with said first latch member.

13. Water jetting apparatus according to claim 12, wherein said first latch member includes recess means for receiving said first latch keeper, said first latch keeper includes a latch pin reciprocally supported on said receptacle and having an end facing said recess, and spring means biasing said pin for said end of said pin to extend into said recess.

14. Water jetting apparatus according to claim 7, wherein said longitudinally slidably interengaging means includes plate means on said jetter unit, a support surface on said first support member means, and finger means on said first support member means and spaced from said support surface for said plate means to be received therebetween.

15. Water jetting apparatus according to claim 14, wherein said plate means includes base plate means on said jetter unit and foot mounting plate means attached to said base plate, and a pair of foot members mounted on said mounting plate means and extending downwardly therefrom, said foot members having lower ends spaced below said support surface on said first support member means.

16. Water jetting apparatus according to claim 15, wherein said first latch means includes a first latch member mounted on one of said jetter unit and said second support member means and first latch keeper means mounted on the other of said jetter unit and second support member means.

17. Water jetting apparatus according to claim 16, wherein said means for removably attaching said jetter unit to said first and second support member means further includes a latch and foot mounting plate on said jetter unit, said first latch member being attached to said latch and foot mounting plate, and said first latch keeper means being mounted on said second support member.

18. Water jetting apparatus according to claim 17, and a pair of foot members attached to said latch and foot mounting plate and extending therefrom into engagement with said second support member means.

19. Water jetting apparatus according to claim 1, wherein said hose reel means includes a hose reel and frame means supporting said hose reel for rotation about a reel axis, said second latch means including a second latch member mounted on one of said frame means and said third support member means, and second latch keeper means mounted on the other of said frame means and second support member means.

20. Water jetting apparatus according to claim 19, wherein said reel axis is parallel to a plane between said side member means, and said second latch member and said second latch keeper means include means interengaging to support said frame means for displacement relative to said third support member means about a pivot axis transverse to said reel axis.

21. Water jetting apparatus according to claim 20, wherein said frame means includes first and second leg means for supporting said hose reel for rotation about said reel axis when said hose reel means is removed from said cart.

22. Water jetting apparatus according to claim 21, wherein said frame means includes third leg means, said second latch member being mounted on said third leg means, and said second latch keeper means being mounted on said third support member means.

23. Water jetting apparatus according to claim 22, wherein said second latch keeper means includes a receptacle for receiving said second latch member and a second latch keeper on said receptacle for releasably interengaging with said second latch member.

24. Water jetting apparatus according to claim 23, wherein said second latch member is rotatable in said receptacle therefor about said pivot axis and includes an annular recess coaxial with said pivot axis, said second latch keeper being supported on said receptacle for displacement transverse to said pivot axis and having an end displaceable into and out of said recess.

25. Water jetting apparatus according to claim 24, wherein said second latch keeper includes threaded rod means threadedly interengaged with said receptacle.

26. Water jetting apparatus according to claim 20, wherein said second latch member is mounted on said third support member means.

27. Water jetting apparatus according to claim 26, wherein said second latch keeper means includes a receptacle for receiving said second latch member and a second latch keeper on said receptacle for releasably interengaging with said second latch member.

28. Water jetting apparatus according to claim 27, wherein said second latch member is rotatable in said receptacle therefor about said pivot axis and includes an annular recess coaxial with said pivot axis, said second latch keeper being supported on said receptacle for displacement transverse to said pivot axis and having an end displaceable into and out of said recess.

29. Water jetting apparatus comprising cart means having longitudinally opposite ends, said cart means including first and second cart portions, means interengaging said cart portions for relative displacement longitudinally between extended and collapsed positions, wheel means on said first cart portion, handle means on said second cart portion, a water jetting unit, means for removably mounting said jetter unit on said first cart portion, jetter hose reel means, and means for removably mounting said hose reel means on said second cart portion.

30. Water jetting apparatus according to claim 29, wherein said cart means in said extended position has a generally horizontal use position in which said wheel means and handle means engage an underlying support surface, said jetter unit and said hose reel means being horizontally adjacent one another in said user position of said cart means.

31. Water jetting apparatus according to claim 30, wherein said means for removably mounting said hose reel means on said second cart portion includes means supporting said hose reel means for rotation about a vertical axis when said cart means is in said use position.

32. Water jetting apparatus according to claim 31, and means for releasably securing said hose reel means against rotation about said vertical axis.

33. Water jetting apparatus according to claim 29, wherein said jetter unit has top and bottom sides, a handle on said top side for lifting said jetter unit, and a plurality of feet on said bottom side for supporting said jetter unit when removed from said cart means.

34. Water jetting apparatus according to claim 29, wherein said hose reel means includes a hose reel and frame means supporting said hose reel for rotation about a reel axis, and said frame means including leg means for supporting said hose reel on an underlying surface for rotation about said reel axis when said hose reel means is removed from said cart means.

35. Water jetting apparatus according to claim 34, wherein said jetter unit has top and bottom sides, a handle on said top side for lifting said jetter unit, and a plurality of feet on said bottom side for supporting said jetter unit when removed from said cart means.

36. Water jetting apparatus according to claim 35, wherein said means for removably mounting said hose reel means supports said hose reel means for rotation about an axis transverse to said reel axis.

37. Water jetting apparatus according to claim 29, wherein said means for removably mounting said jetter unit on said first cart portion includes first and second mounting means, said first mounting means including a first support member on said first cart portion, plate means on said jetter unit overlying said support member, and finger means on said support member overlying said plate means, said second mounting means including a second support member on said first cart portion, a latch member on said jetter unit, and latch keeper means on said second support member.

38. Water jetting apparatus according to claim 29, wherein said means for removably mounting said hose reel means on said second cart portion includes a reel support member on said second cart portion, a latch plug member on said hose reel means, and latch plug keeper means on said reel support member.

39. Water jetting apparatus according to claim 38, wherein said means for removably mounting said jetter unit on said first cart portion includes first and second mounting means, said first mounting means including a first support member on said first cart portion, plate means on said jetter unit overlying said support member, and finger means on said first support member overlying said plate means, said second mounting means including a second support member on said first frame portion, a latch member on said jetter unit, and latch keeper means on said second support member.

40. Water jetting apparatus according to claim 39, wherein said hose reel means includes a hose reel rotatable about a reel axis, and said latch plug member and said latch plug keeper means support said hose reel means on said second cart portion for rotation about an axis transverse to said reel axis.

41. Water jetting apparatus according to claim 39, wherein said jetter unit has top and bottom sides, a handle on said top side for lifting said jetter unit, and a plurality of feet on said bottom side for supporting said jetter unit when removed from said cart means.

42. Water jetting apparatus according to claim 41, wherein said hose reel means includes a hose reel and frame means supporting said hose reel for rotation about a reel axis, and said frame means including leg means for supporting said hose reel on an underlying surface for rotation about said reel axis when said hose reel means is removed from said cart means.

43. Water jetting apparatus according to claim 42, wherein said latch plug member and said latch plug keeper means support said hose reel means on said second cart portion for rotation about an axis transverse to said reel axis.

44. Water jetting apparatus according to claim 39, wherein said latch keeper means on said second support member includes a first receptacle for receiving said latch member on said jetter unit, said latch member including a recess, and said latch keeper means further including a pin reciprocally supported on said first receptacle and having an end facing said recess, and spring means biasing said pin for said end of said pin to extend into said recess.

45. Water jetting apparatus according to claim 44, wherein said latch plug keeper means includes a second receptacle for receiving said latch plug member, said latch plug member including a recess, and said latch plug keeper means further including a keeper member supported on said second receptacle for displacement relative to said latch plug member and having an end displaceable into and out of said recess.

46. Water jetting apparatus according to claim 45, wherein said latch plug member has an axis and said second receptacle and latch plug member support said hose reel means for rotation relative to said second cart portion about said axis of said latch plug member.

47. Water jetting apparatus according to claim 46, wherein said keeper member includes a threaded rod threadedly interengaged with said second receptacle.

48. Water jetting apparatus according to claim 47, wherein said jetter unit has top and bottom sides, a handle on said top side for lifting said jetter unit, a plurality of feet on said bottom side for supporting said jetter unit when removed from said cart mean, said hose reel means including a hose reel and frame means supporting said hose reel for rotation about a reel axis, and said frame means including leg means for supporting said hose reel on an underlying surface for rotation about said reel axis when said hose reel means is removed from said cart means.

\* \* \* \* \*